United States Patent [19]

Bienek et al.

[11] Patent Number: 5,012,879

[45] Date of Patent: May 7, 1991

[54] SELF-PROPELLED JACKING APPARATUS FOR FACTORY CONSTRUCTED BUILDINGS

[76] Inventors: Richard J. Bienek, 2274 Bulson Rd., Mount Vernon, Wash. 98273; Henry E. Ford, 16600 25th Ave. NE., Rte. 106, Arlington, Wash. 98223

[21] Appl. No.: 544,190

[22] Filed: Jun. 26, 1990

[51] Int. Cl.[5] .............................................. B62D 11/04

[52] U.S. Cl. .................................. 180/6.48; 280/638; 180/313; 414/495; 254/9 R; 254/126

[58] Field of Search ............... 180/6.48, 313; 414/455, 414/495; 280/149.2, 638, 656; 254/9 R, 126

[56] References Cited

U.S. PATENT DOCUMENTS

| | | | |
|---|---|---|---|
| 2,801,864 | 8/1957 | Raney et al. | 280/656 |
| 2,896,909 | 7/1959 | Taylor | 254/9 R |
| 4,092,012 | 5/1978 | Ishigami | 254/126 |
| 4,621,562 | 11/1986 | Carr et al. | 180/6.48 |
| 4,854,805 | 8/1989 | Althoff et al. | 414/495 |

*Primary Examiner*—Charles A. Marmor
*Assistant Examiner*—Mitchell Bompey
*Attorney, Agent, or Firm*—Robert W. Jenny

[57] ABSTRACT

The invention provides apparatus for precise, well controlled positioning and levelling of factory constructed buildings. The apparatus comprises units used in pairs, one near each end of a building being installed. Each unit is a four wheeled vehicle with a jack at each end. Each wheel is independently driven and the units are remotely controlled, using cables, hydraulic or pneumatic hoses or wireless apparatus. In use the units are moved under the building under their own power and adjusted and maneuvered so that the jacks can engage the longitudinal beams used in factory manufactured buildings. The jacks are then operated to raise, lower and level the building and the wheels are driven to move the position the building desired. The jacks support pivotally mounted jack plates which can remain in secure engagement with the beam while the units are maneuvered such that the building can be moved lengthwise or sidewise or turned about an axis essentially perpendicular to the terrain.

2 Claims, 3 Drawing Sheets

FIG. 3
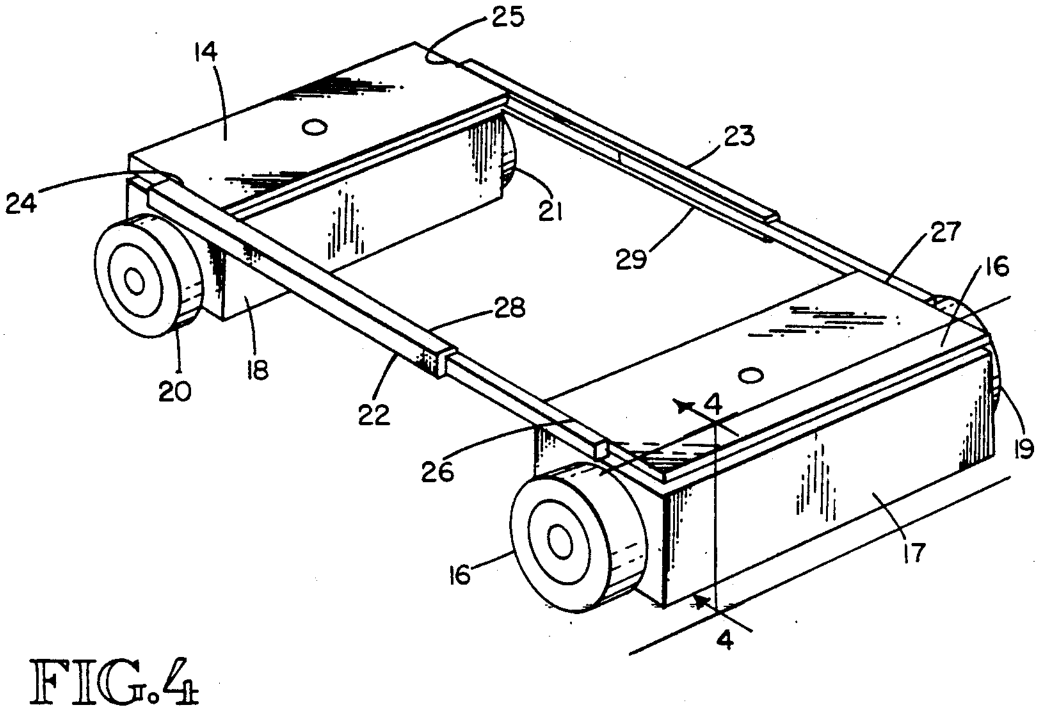
FIG. 4
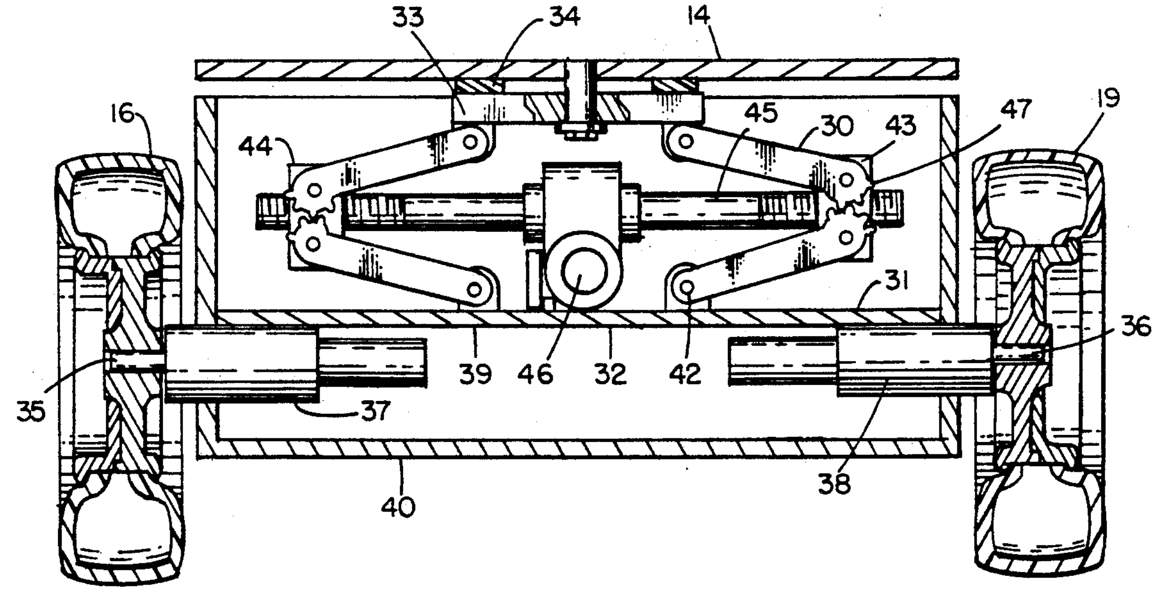
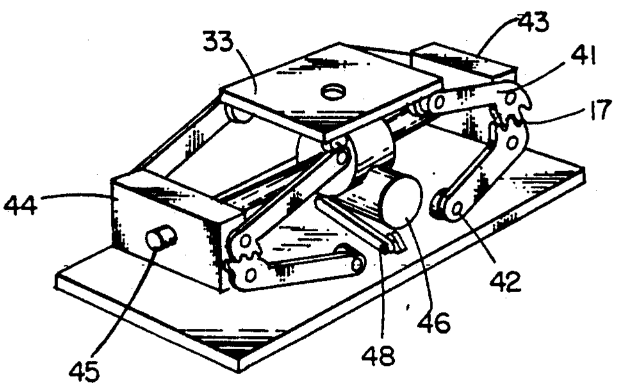
FIG. 5

SELF-PROPELLED JACKING APPARATUS FOR FACTORY CONSTRUCTED BUILDINGS

BACKGROUND OF THE INVENTION

Field: The subject invention is in the fields of self-propelled apparatus such as self-propelled, adjustable scaffolding and jacks, particularly jacks used in structures and the erection and leveling of structures. Still more particularly, it is in the field of self-propelled apparatus incorporating jacking apparatus.

Prior art: The subject invention is provided for moving and leveling factory constructed buildings during on-site installation of such buildings. No prior art apparatus provided for the purpose is known to the inventors. However, the patents listed below cover apparatus related to the fields cited above.

3,840,210 4,629,020

4,221,581 4,747,457

4,860,841

There are legal requirements that factory constructed buildings, including those commonly termed mobile homes, be trailers, towable behind appropriate towing vehicles and licensed as trailers. Such buildings are commonly built from two buildings attached to each other. A building is towed to a site on which it is to be installed and is maneuvered into place on the site as accurately as feasible by the towing vehicle. Precise positioning of a building by the towing vehicle is difficult, particularly in terms of its position transverse to the towing, i.e. lengthwise, direction. This difficulty is considerably increased when one building must be positioned immediately next to another, such as when two or more buildings are to be attached to each other to form a building larger than the maximum size building legally towable on a highway. It is widespread current practice to do the final, precise positioning of a building by lifting it on jacks and then toppling the jacks in the direction the building is to be moved. The buildings are often damaged when this technique is used. Once the building is positioned the jacks are used to hold it level and at the required height while appropriate supports are provided for the building. The jacks are removed after the weight of the building is transferred to the supports.

The primary objective of the subject invention is to provide apparatus for precise, controlled positioning and leveling of factory constructed buildings with virtually no chance of damaging the building in the process. A second objective is that the apparatus reduce the time required to install the buildings. A third objective is that the apparatus be economical to manufacture and use since economy is one of the prime advantages of using factory constructed buildings.

SUMMARY OF THE INVENTION

The subject invention is self-propelled jacking apparatus for positioning and leveling factory constructed buildings. Such buildings are characteristically long relative to their width and are legally trailers, complete with tow bars and wheels. An essential support structure of such buildings comprises two parallel beams under the floor. The beams run lengthwise of the building and are equidistant from the longitudinal centerline. The suspension system, including the springs, axles and wheels, and the tow bar are attached to these beams. Also, all jacks are positioned to contact the beams. The beams may be different distances apart on various buildings, 78" and 113" being two characteristic distances between centerlines of the beams.

The subject apparatus comprises units used in pairs. Each unit comprises two jacks, a jack plate pivoted on the active end of each jack, two wheels and interconnecting support structure supporting each jack, adjustable length tie bars interconnecting the jack plates and apparatus to drive and control each wheel independently. The jack plates are rectangular in planform and the two wheels under each jack have a common axis and are spaced apart a distance equal to or somewhat greater than the long dimension of the jack plate. The jack plate pivots allow adjustment of the axis of the wheels between being at right angles to the long axis of the jack plates to parallel to them in planview, the adjustment being achieved by differential control of the wheels. With the wheel axes and jack plate long axes parallel the unit has the appearance of a four wheeled vehicle with a jack assembly at each end.

In use, once the building is roughly positioned by the towing vehicle,. one unit is positioned under its own power under each end of the building with the tie bars adjusted in length so that the jack plates can be positioned under the beams and the tie bars are essentially perpendicular to the long axes of the beams. When the jacks are activated to extend, the jack plates engage the beams and lift the building to a controlled height. The jacks can then be actuated independently to level the building and the building can be moved sidewise by activating the wheels. Once the units are supporting the building the wheels axes can be turned to be at right angles to the long axes of the jack plates and the building moved lengthwise. All four wheel axes of the two units are usually kept parallel; however, they can be adjusted to cooperate and move the building like a vehicle with two wheel steering or four wheel steering.

The invention is described in more detail below with reference to the attached drawings.

BRIEF DESCRIPTION OF THE DRAWINGS

FIG. 3 is a perspective view of the unit of the apparatus.

FIG. 4 is a partially sectioned semi-schematic of the unit of FIG. 3. FIG. 5 illustrates the jack schematically in more detail.

DETAILED DESCRIPTION OF THE INVENTION

Figure 1:
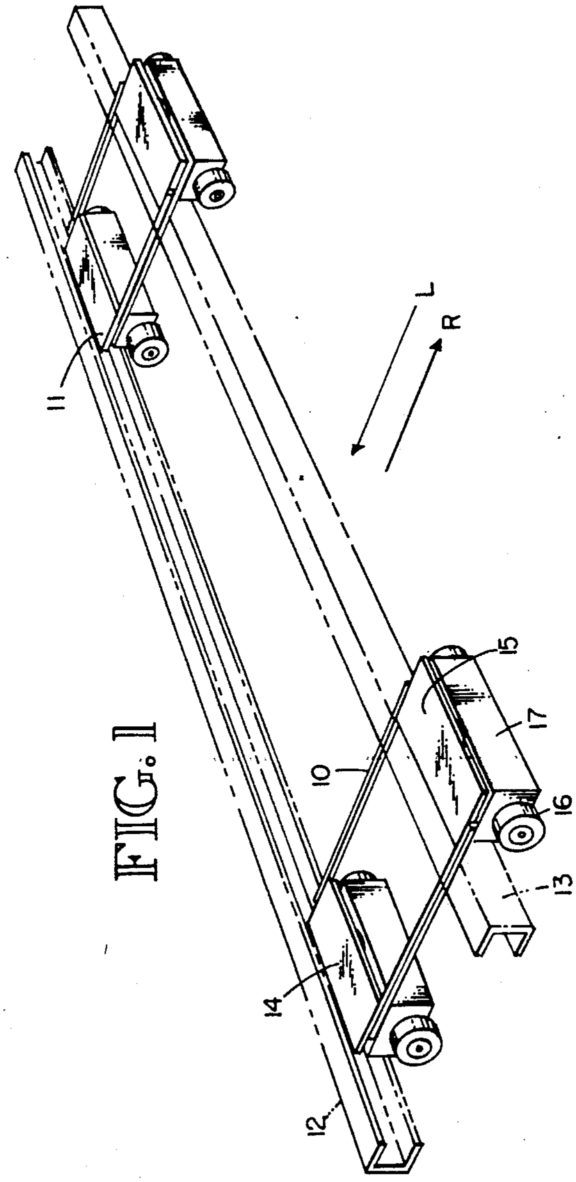
FIG. 1 is a perspective view of the subject apparatus supporting the beams of a factory constructed building (phantom lines) with the apparatus adjusted to move the building sidewise.

The invention is apparatus for use in precision positioning and leveling of factory manufactured buildings during installation of such buildings. Such buildings are supported on two parallel beams extending the length of the building and positioned equidistant from its longitudinal centerline and the subject apparatus contacts these beams in supporting a building while moving and leveling the building. The apparatus comprises units used in pairs and in FIG. 1 units 10 and 11 are shown supporting beams 12 and 13, shown in phantom lines. Each unit has two jacking units, each having a jack plate, one positioned under each beam, jack plates 14 and 15 being typical. Each unit also has four independently driven wheels, wheel 16 being typical, two wheels being mounted on each of two jacking units, jacking unit 17 being typical. The jacking units house jacks, described below, to which the jack plates are pivotally attached. With the apparatus arranged as shown in FIG. 1, simultaneous actuation of all the wheels in clockwise direction will move the apparatus and building supported on it sidewise in the direction indicated by arrow R. Similarly, simultaneous actuation of the wheels in counterclockwise rotation will move the building sidewise in the direction indicated by arrow L.

Figure 2:
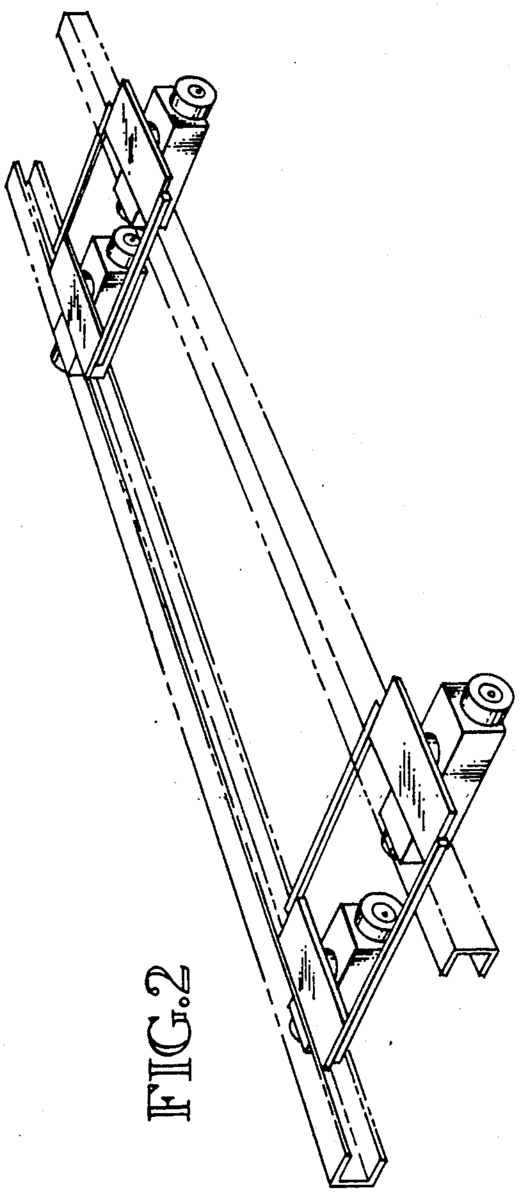
FIG. 2 is similar to FIG. 1 but the apparatus is adjusted to move the building lengthwise.

Actuation of the wheels on each jacking unit in opposite directions causes the boxes to turn relative to the jacking plates engaging the beams and, in FIG. 2, the jacking units have been turned and positioned so that appropriate simultaneous actuation of all the wheels will move the supported beams and building lengthwise selectively in either direction.

It is considered understandable that with appropriate positioning and actuation of the individual wheels the supported beams and building can be moved linearly in any direction and also rotated about an axis essentially perpendicular to the terrain on which the units are used.

A unit is shown in more detail in FIG. 3. Jack plates 14 and 15 are pivotally supported as explained below on jacking units 17 and 18 respectively. Each jacking unit has the elongated rectangular shape shown and is supported by a wheel at each end, wheels 16 and 19 on box 17 and wheels 20 and 21 on box 18. The two jack plates are interconnected by tie beams 22 and 23 attached to the jack plates at their ends 24, 25, 26 and 27. The center portions 28 and 29 of the beams are telescopic to enable adjustments of the beam length and accordingly the distance between the jack plates to accommodate variations in the distances the beams are spaced apart on various buildings. The tie beams may be straight or contoured as necessary to accommodate structure or the like which may be between the beams and extend below the lower surfaces of the beams. Apparatus, such as clamps (not shown) is provided to lock the beams at any adjusted length. The lengths (i.e. the distance between the jack plates) are adjusted by releasing the locking means, actuating the wheels on one box to move it closer to or farther from the other as desired and then resetting the locking means.

A jacking unit is illustrated semi-schematically and not to scale in the sectional view in FIG. 4, taken at 4—4 in FIG. 3. Jack assembly 30, described in more detail below, is mounted on the upper side 31 of base plate 32. Jack plate 14 is pivotally mounted on load support member 33 of the jack assembly and is supported on thrust bearing 34. Wheels 16 and 19 are supported on and driven by shafts 35 and 36 respectively extending from drive units 37 and 38 respectively, attached to the lower side 39 of the base plate. The drive units may be hydraulic, electrohydraulic or electromechanical, as dictated by design and economic considerations. Enclosure box 40 is supported from the base plate and encloses and protects the jack assembly, drive units and other auxiliary equipment such as batteries and control apparatus required. The units may be battery powered, or powered by electrical cables or hydraulic lines from remote power sources or powered by internal combustion engines. Control may be provided through cables or hoses and/or by wireless apparatus.

FIG. 5 is a perspective view of a jack mounted on a base plate. A conventional scissor jack is shown in this embodiment, electromechanically driven. However, any appropriate jack can be used without departing from the scope of this invention. The jack in FIG. 5 comprises 8 links, link 41 being typical. The primary links are pivotably connected to the base plate at one of their ends, connection 42 being typical and to crossbeams 43 and 44 at their other ends. Similarly, four of the links are pivotably connected at their ends to load support member 32 and the crossbars. The crossbars are interconnected by shaft 45 which is threaded into each crossbar with the threads at one end being of opposite hand to those on the other end. The shaft is rotated in either direction by electromechanical unit 46. When it is driven in one direction the crossbars are drawn together, raising the level of member 32. When the shaft is driven in the other direction, the level is lowered.

Gear teeth, teeth 47 being typical, on the links serve to stabilize the load support member. Link 48, interconnecting unit 46 to the base plate prevents rotation of the unit around shaft 45 while allowing it to rise and fall with the jack action.

Figure 6:
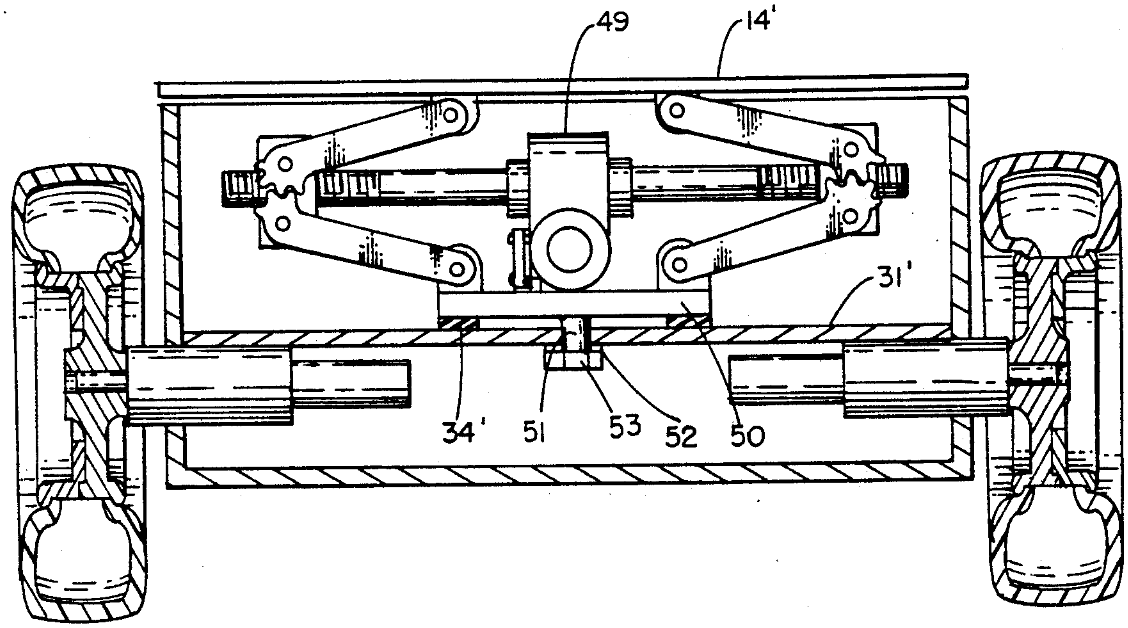
FIG. 6 is a partially sectioned semi-schematic similar to FIG. 4 but showing an alternate embodiment.

FIG. 6 is a view similar to that of FIG. 4 but showing an alternate embodiment in which jacking plate 14' is part of the jack assembly 40 and the jack assembly further comprises base 50 which is pivotally connected to base plate 31' by pivot 51, washer 52 and nut 53, pivot 51 being attached to the base. In this embodiment the jack plate and jack assembly pivot together, supported by thrust bearing 34'.

The apparatus may include any of a variety of means for detachably attaching the jack plates to the beams for added stability and reliability during operation.

It has been determined during the development of the subject invention that design and manufacture of the system and apparatus for powering and controlling the wheel drives and jacks of the subject apparatus are within the capability of persons having ordinary skill in the art and therefore the system and apparatus for powering and controlling is not part of the invention.

In use the units are positioned relative to the beams of a building as shown in FIGS. 1 and 2 by moving them into position under their own power either from the side, i.e. perpendicular to the length of the beam, or from the ends with the jack plates turned 90° with respect to the wheel axes in plan view as shown in FIG. 2. Once positioned, the jack units are operated to raise, lower and level the building as well as move it precisely into position.

It is considered to be understandable from this description that the invention meets its objectives. It provides apparatus for precise, well controlled positioning and leveling of factory constructed buildings. The invention reduces the time required to install such buildings. Also, it is simple and comprises a significant proportion of commercial available parts and is therefore economical to manufacture and use.

It is also considered to be understandable that while certain embodiments of the invention are described herein, other embodiments and modifications of those described are possible within the scope of the invention which is limited only by the attached claims.

We claim:

1. Four wheeled jacking apparatus comprising first and second jacking units, each of said units comprising:
a base plate having an upper side and a lower side and first and second ends,
a powered jack mounted on said upper side and having a load support member oriented essentially parallel to said base plate,
a jacking plate and
a thrust bearing,
said jacking plate having a first end and a second end and being pivotally mounted on said load support member with said jacking plate separated from said load support member by said thrust bearing,
two wheels, each having an axis of rotation and
two wheel drive units, each having a drive shaft having an axis of rotation,
one of said two wheels being attached to said drive shaft of one of said two wheel drive units and the other of said two wheels being attached to said drive shaft of the other of said two drive units,
said wheel drive units being attached to said lower side of said base plate such that all of said axes of rotation are coincident and one of said wheels is at said first end of said base plate and the other wheel is at said second end of said base plate,
auxiliary equipment and
a box,
said box being attached to said base plate and said auxiliary equipment being installed in said box,
first and second adjustable length tie beams, each having a first end and a second end,
said first end of said first adjustable length tie beam being attached to said first end of said jacking plate of said first jacking unit, said second end of said first adjustable length tie beam being attached to said second end of said jacking plate of said second jacking unit, said first end of said second adjustable length tie beam being attached to said second end of said jacking plate of said first jacking unit and said second end of said second adjustable length tie beam being attached to said first end of said second jacking unit, whereby said jacking apparatus is a four-wheeled apparatus.

2. Four wheeled jacking apparatus comprising first and second jacking units, each of said units comprising:
a base plate having an upper side and a lower side and first and second ends,
a powered jack,
a jacking plate having a first end and a second end,
a thrust bearing,
said jacking plate being attached to said jack,
said jack being pivotally mounted on said upper side of said base plate and separated from said base plate by said thrust bearing with said jacking plate essentially parallel to said base plate,
two wheels, each having an axis of rotation and
two wheel drive units, each having a drive shaft having an axis of rotation,
one of said two wheels being attached to said drive shaft of one of said two wheel drive units and the other of said two wheels being attached to said drive shaft of the other of said two drive units,
said wheel drive units being attached to said lower side of said base plate such that all of said axes of rotation are coincident and one of said wheels is at said first end of said base plate and the other wheel is at said second end of said base plate,
auxiliary equipment and
a box,
said box being attached to said base plate and said auxiliary equipment being installed in said box,
first and second adjustable length tie beams, each having a first end and a second end,
said first end of said first adjustable length tie beam being attached to said first end of said jacking plate of said first jacking unit, said second end of said first adjustable length tie beam being attached to said second end of said jacking plate of said second jacking unit, said first end of said second adjustable length tie beam being attached to said second end of said jacking plate of said first jacking unit and said second end of said second adjustable length tie beam being attached to said first end of said second jacking unit, whereby said jacking apparatus is a four-wheeled apparatus.

* * * * *